(12) United States Patent
Patel et al.

(10) Patent No.: US 11,332,651 B2
(45) Date of Patent: May 17, 2022

(54) SYNTHETIC FUNCTIONALIZED ADDITIVES, METHODS OF SYNTHESIZING, AND METHODS OF USE

(71) Applicant: Saudi Arabian Oil Company, Dhahran (SA)

(72) Inventors: Hasmukh A. Patel, Houston, TX (US); Carl J. Thaemlitz, Cypress, TX (US); Ashok Santra, The Woodlands, TX (US)

(73) Assignee: Saudi Arabian Oil Company, Dhahran (SA)

( * ) Notice: Subject to any disclaimer, the term of this patent is extended or adjusted under 35 U.S.C. 154(b) by 82 days.

(21) Appl. No.: 16/558,772

(22) Filed: Sep. 3, 2019

(65) Prior Publication Data

US 2020/0071591 A1 Mar. 5, 2020

Related U.S. Application Data

(60) Provisional application No. 62/726,512, filed on Sep. 4, 2018.

(51) Int. Cl.
| | |
|---|---|
| *C09K 8/22* | (2006.01) |
| *C09K 8/03* | (2006.01) |
| *C01B 33/32* | (2006.01) |
| *C01B 33/22* | (2006.01) |
| *C07F 7/08* | (2006.01) |
| *C09K 8/06* | (2006.01) |

(52) U.S. Cl.
CPC ............... *C09K 8/03* (2013.01); *C01B 33/22* (2013.01); *C01B 33/325* (2013.01); *C07F 7/087* (2013.01); *C09K 8/06* (2013.01); *C09K 8/22* (2013.01)

(58) Field of Classification Search
CPC ... C09K 8/03; C09K 8/06; C09K 8/22; C09K 8/035; C07F 7/087; C01B 33/325; C01B 33/22; B01J 37/036; B01J 21/16
See application file for complete search history.

(56) References Cited

U.S. PATENT DOCUMENTS

| | | | |
|---|---|---|---|
| 4,830,843 | A | 5/1989 | Usui et al. |
| 7,244,797 | B2 | 7/2007 | Kurihara et al. |
| 8,142,752 | B2 | 3/2012 | Kovanda et al. |
| 8,202,501 | B2 | 6/2012 | Martin et al. |
| 9,175,161 | B2 | 11/2015 | Aucejo Romero et al. |
| 2013/0143988 | A1 | 6/2013 | Aucejo Romero et al. |
| 2013/0177723 | A1 | 7/2013 | Aucejo Romero et al. |
| 2014/0205528 | A1 | 7/2014 | Le Roux et al. |
| 2015/0047848 | A1 | 2/2015 | Bestaoui-Spurr et al. |
| 2015/0083415 | A1 | 3/2015 | Monroe et al. |
| 2019/0055464 | A1 | 2/2019 | Rediger |

FOREIGN PATENT DOCUMENTS

KR 20160000287 * 1/2016

OTHER PUBLICATIONS

Moura (K.O. Moura, et al, Comparative adsorption of CO2 by mono-, di-, and triamino-organo functionalized magnesium phyllosilicates, Environ. Sci. Technol. 2013, 47, 12201-12210).*
Moura et al, Physico-chemical of organo-functionalized magnesium phyllosilicate prepared by microwave heating, Microporous and Mesoporous Materials, 2014, 190, 292-297).*
Moscofian (Moscofian et al, Stability of layered aluminum and magnesium organosilicates, Microporous and Mesoporous Materials, 2007, 107, 113-119).*
Burkett (Burkett et al, Synthesis, characterization, and reactivity of layered inorganic-organic nanocomposites Based on 2:1 trioctahedral phyllosilicates,Chemistry of materials, American Chemical Society, 1997, 9, 1071-1072).*
Moscofian (Moscofian et at, Synthesized layered inorganic-organic magnesium organosilicate containing a disulfide moiety as a promising sorbent for cations removal, Journal of Hazardous Materials, 2008, 160, 63-69).*
International Search Report and Written Opinion dated Nov. 15, 2019 pertaining to Application No. PCT/US2019/050746 filed Sep. 12, 2019.
Fujii et al. "Synthesis of an Alkylammonium/Magnesium Phyllosilicate Hybrid Nanocomposite Consisting of a Smectite-Like Layer and Organosiloxane Layers" Chem. Mater. 2003, 15, 1189-1197, 9 pgs.
Fujii et al. "Intercalation compounds of a synthetic alkylammonium-smectite with alkanolamines and their unique humidity response properties" Applied Clay Science 104 (2015) 88-95, 8 pgs.
Silva et al. "Layered Inorganic-Organic Talc-like Nanocomposites" Chem. Mater. 2002, 14, 175-179, 5 pgs.
Suter et al. "Rule based design of clay-swelling inhibitors" Energy & Environmental Science, Energy Environ. Sci., 2011, 4, 4572, 15 pgs.
Moscofian et al. "Stability of layered aluminum and magnesium organosilicates" Elsevier, Microporous and Mesoporous Materials 107 (2008) 113-120, 8 pgs.
Moura et al. "Physico-chemical of organo-functionalized magnesium phyllosilicate prepared by microwave heating" Microporous and Mesoporous Martials 190 (2014) 292-300, 9 pgs.

(Continued)

*Primary Examiner* — Kumar R Bhushan
(74) *Attorney, Agent, or Firm* — Dinsmore & Shohl LLP

(57) ABSTRACT

Embodiments of the present disclosure are directed to embodiments of synthetic functionalized additives. The synthetic functionalized additive may include a layered magnesium silicate. The layered magnesium silicate may include a first functionalized silicate layer including a first tetrahedral silicate layer covalently bonded to at least two different functional groups, an octahedral brucite layer, including magnesium, and a second functionalized silicate layer including a second tetrahedral silicate layer covalently bonded to at least two different functional groups. The octahedral brucite layer may be positioned between the first functionalized silicate layer and the second functionalized silicate layer. The at least two different functional groups covalently bonded to the first tetrahedral silicate layer may be the same or different than the at least two different functional groups covalently bonded to the second tetrahedral silicate layer.

13 Claims, 4 Drawing Sheets

(56) References Cited

OTHER PUBLICATIONS

Moscofian et al. "Synthesized layered inorganic-organic magnesium organosilicate containing a disulfide moiety as a promising sorbent for cations removal" Journal of Hazardous Materials 160 (2008) 63-69, 7 pgs.
Burkett et al. "Synthesis, Characterization, and Reactivity of Layered Inorganic-Organic Nanocomposites Based on 2:1 Trioctahedral Phyllosilicates" Chem. Mater. 1997, 9, 1071-1073, 3 pgs.
International Search Report and Written Opinion dated Nov. 15, 2019 pertaining to Application No. PCT/US2019/049310 filed Sep. 3, 2019.
Patel et al. "Synthetic talc as a solid base catalyst for condensation of aldehydes and ketones" Journal of Molecular Catalysis A: Chemical 286 (2008) 31-40, 10 pgs.
Claverie et al. "Synthetic talc and talc-like structures: preparation, features and applications" Chemistry—A European Journal, Wiley-VCH Verlag, 2018, 24 (3), pp. 519-542. 27 pgs.
Second Examination Report dated Dec. 23, 2020 pertaining to GCC Application No. GC 2019-38272 filed Sep. 12, 2019.
U.S. Notice of Allowance and Fee(s) Due dated Oct. 1, 2021 pertaining to U.S. Appl. No. 16/568,693, filed Sep. 12, 2019, 9 pages.
Office Action dated Jun. 24, 2021 pertaining to U.S. Appl. No. 16/568,693, filed Sep. 12, 2019, 22 pages.

* cited by examiner

Layered Magnesium Silicates (LMS)

$X = 0 - 20$ and $y = 0 - 20$; $-NH_2$ as o, m, or p on phenyl

SYNTHETIC FUNCTIONALIZED ADDITIVES, METHODS OF SYNTHESIZING, AND METHODS OF USE

CROSS-REFERENCES TO RELATED APPLICATIONS

This application claims priority to U.S. App. No. 62/726,512, entitled "SYNTHETIC LAYERED MAGNESIUM SILICATES AND THEIR DERIVATIVES FOR HIGH PERFORMANCE OIL-BASED DRILLING FLUIDS," filed on, Sep. 4, 2018, the entire disclosure of which is incorporated by reference.

TECHNICAL FIELD

Embodiments described herein generally relate to compositions and methods for use as fluid additives and, more specifically, to compositions and methods for enhancing drilling fluids in a downhole environment.

BACKGROUND

Wellbore construction and production procedures may include drilling, completion, matrix stimulation, fracturing, or other wellbore construction and production enhancement procedures. Some wellbore construction and production procedures may utilize wellbore fluids. Drilling fluids include water-based muds (WBMs), oil-based muds (OBMs), and pneumatic fluids, which may be utilized in subterranean and oil well drilling and completion operations.

SUMMARY

WBMs have some inherent advantages when compared to other drilling fluids, such as, in some embodiments, being more economically viable, more environmentally benign, or both. However, WBMs may experience thinning while drilling under high temperature high pressure (HTHP) downhole conditions. HTHP conditions may be defined as having an undisturbed bottomhole temperature of greater than 300° F. (149° C.) and a pore pressure of at least 0.8 psi/ft (~15.3 lbm/gal). Due to this thinning, problems may include one or more of pipe sticking, low rates of penetration of the drill bit, and high torque requirements for drilling operations.

Bentonite clays, polymers, or combinations of these may be utilized in an attempt to maintain the rheological properties of WBMs. However, bentonite clays may lose their effectiveness at HTHP, even when added in large quantities. Polymers, either natural or synthetic, may undergo degradation or thinning of viscosity with respect to a rise in temperature.

As such, there are needs for additives that may improve the stability of WBMs' rheological properties and filtration behaviors in HTHP wells. Embodiments of the present disclosure meet those needs by providing synthetic functionalized additives. In some embodiments, the disclosed synthetic functionalized additives may be utilized in drilling fluids used for wellbore applications. In some embodiments, the synthetic functionalized additives may be utilized to at least partially reduce thinning of the drilling fluids while drilling under HTHP downhole conditions. In some embodiments, WBMs containing the synthetic functionalized additives described herein may demonstrate improved rheological properties while reducing the number of other additives (that is, bentonite clays, polymers, or combinations of these) in the WBMs.

According to at least one embodiment of the present disclosure, a synthetic functionalized additive is provided. The synthetic functionalized additive may include a layered magnesium silicate. The layered magnesium silicate may include a first functionalized silicate layer including a first tetrahedral silicate layer covalently bonded to at least two different functional groups, an octahedral brucite layer, including magnesium, and a second functionalized silicate layer including a second tetrahedral silicate layer covalently bonded to at least two different functional groups. The octahedral brucite layer may be positioned between the first functionalized silicate layer and the second functionalized silicate layer. The at least two different functional groups covalently bonded to the first tetrahedral silicate layer may be the same or different than the at least two different functional groups covalently bonded to the second tetrahedral silicate layer.

According to at least one embodiment of the present disclosure, a method of producing a synthetic functionalized additive is provided. The method may include mixing a magnesium salt with a fluid medium to produce a magnesium-containing fluid, adding a first silane and a second silane to the magnesium-containing fluid to produce a reactant mix, adding an aqueous hydroxide to the reactant mix to produce a reaction mixture, mixing the reaction mixture for a mix period, refluxing the reaction mixture for a reflux period to produce a product mix, and treating the product mix to separate the synthetic functionalized additive. The first silane and the second silane may have different compositions. The synthetic functionalized additive may include a layered magnesium having mixed functionalities.

According to at least one embodiment of the present disclosure, a drilling fluid is provided. The drilling fluid may include an aqueous base fluid and a synthetic functionalized additive. The synthetic functionalized additive may include a layered magnesium silicate. The layered magnesium silicate may include a first functionalized silicate layer including a first tetrahedral silicate layer covalently bonded to at least two different functional groups, an octahedral brucite layer, including magnesium, and a second functionalized silicate layer including a second tetrahedral silicate layer covalently bonded to at least two different functional groups. The octahedral brucite layer may be positioned between the first functionalized silicate layer and the second functionalized silicate layer. The at least two different functional groups covalently bonded to the first tetrahedral silicate layer may be the same or different than the at least two different functional groups covalently bonded to the second tetrahedral silicate layer.

These and other embodiments are described in more detail in the following Detailed Description in conjunction with the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Embodiments of the present disclosure are directed to synthetic functionalized additives, methods of producing the same, and methods of use.

As used throughout, "brucite" may refer to a magnesium having monomeric formula $MgO(OH)_2$.

As used throughout, "octahedral" may refer to the crystal pattern defining an octahedron, with eight triangular faces, twelve straight edges, and six vertices.

As used throughout, "tetrahedral" may refer to the crystal pattern defining a tetrahedron, with four triangular faces, six straight edges, and four vertices.

As used throughout, "silane" may refer to a silicon compound containing at least three alkoxy groups (an alkyl group bonded to oxygen), where the 4th substituent includes a functional group and may be a fourth alkoxy group or may be a carbon containing compound.

As used throughout, "viscosifier," "viscosity modifier," and "rheological modifier" may refer to compounds that change rheological properties when added to a fluid. Viscosifiers may be used to increase the viscosity of a fluid.

As used throughout, "thixotropic" may refer to the tendency of a fluid or gel to exhibit a decrease in viscosity when a stress or a change in temperature is applied, such as mixing, shaking, shearing, or agitating. This property may be time-dependent. Thixotropic control additives may include additives that may minimize the decrease in viscosity of a fluid when a stress or a change in temperature is applied.

As used throughout, "suspension additives" may refer to additives that may reduce settling of solid particles in fluids or gels.

As used throughout, "rheologically-independent behavior" may refer to a fluid that does not experience changes in rheological properties, such as viscosity and thixotropy, due to a variation in an applied stress. Applied stresses may include shear stress, temperature, and combinations of the same. For example, a variation in an applied stress would occur when a rate of mixing is increased or decreased. An example of a fluid that exhibits rheologically-independent behavior is a fluid that does not experience a change in viscosity due to a variation in the temperature.

Figure 1:
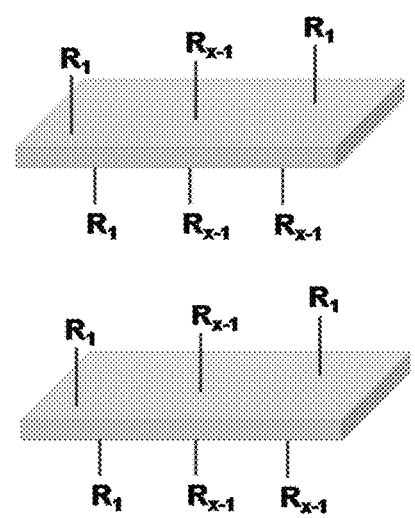
FIG. 1 is a schematic depiction of a layered magnesium silicate, according to one or more embodiments of the present disclosure.
Figure 1:
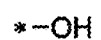
Figure 1:
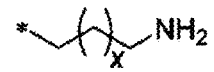
Figure 1:
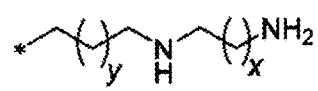
Figure 1:
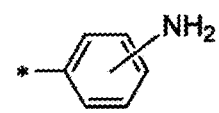

Embodiments of the present disclosure are directed to synthetic functionalized additives and methods of producing the same. The synthetic functionalized additives may include a layered magnesium silicate having mixed functional groups covalently bonded to a tetrahedral silicate layer. A schematic depiction of a layered magnesium silicate, according to one or more embodiments of the present disclosure, is shown in FIG. 1.

Embodiments of the layered magnesium silicate may include a material that includes magnesium. In some embodiments, the material that includes magnesium may be a magnesium salt. In further embodiments, the magnesium salt may be magnesium chloride, magnesium nitrate, magnesium sulfate, or magnesium bromide. In some embodiments, the material that includes magnesium may include magnesium chloride hexahydrate. In embodiments, the material that includes magnesium may include magnesium oxide or magnesium hydroxide.

In some embodiments, the material that includes magnesium may be naturally-occurring. For example, in some embodiments, magnesium hydroxide may be obtained from a naturally-occurring mineral, such as brucite. In other embodiments, the naturally-occurring material that includes magnesium may include magnesium-rich bittern brine, which may be a byproduct of sodium chloride production from sea water.

In embodiments, the material that includes magnesium may be present as a layer of octahedral brucite positioned between two functionalized silicate layers. In some embodiments, a layer of octahedral brucite may be synthesized as part of the process of producing the layered magnesium silicate. The octahedral brucite layer may be synthesized by reacting a magnesium salt with an aqueous hydroxide. Any magnesium salt that may react with a hydroxide may be used, including, but not limited to, magnesium chloride, magnesium chloride hydrates, magnesium nitrate, magnesium nitrate hydrates, magnesium bromide, magnesium bromide hexahydrate, and combinations of the same. Magnesium chloride hydrates have the chemical formula $MgCl_2(H_2O)_x$, where x is selected from 2, 4, 6, 8, and 12. Magnesium nitrate hydrates have the chemical formula $Mg(NO_3)_2(H_2O)_y$, where y is selected from 0, 2, and 6. In embodiments, the aqueous hydroxide may include a hydroxide in water. The hydroxide may be present in an amount of from about 2 wt. % to about 10 wt. %, based on the total weight of the aqueous hydroxide. In embodiments, the hydroxide may be present in an amount of from about 2 wt. % to about 8 wt. %, from about 2 wt. % to about 6 wt. %, from about 2 wt. % to about 4 wt. %, from about 4 wt. % to about 10 wt. %, from about 4 wt. % to about 8 wt. %, from about 4 wt. % to about 6 wt. %, from about 6 wt. % to about 10 wt. %, from about 6 wt. % to about 10 wt. %, or from about 8 wt. % to about 10 wt. %, based on the total weight of the aqueous hydroxide. The hydroxide may be any hydroxide that may react with a salt. Examples of the hydroxide may include sodium hydroxide, potassium hydroxide, ammonium hydroxide, and combinations of the same.

Embodiments of the layered magnesium silicate may include one or more functionalized silicate layers. In embodiments, each of the functionalized silicate layers contains a tetrahedral silicate layer and at least two functional groups. In embodiments, the at least two functional groups are different by having different chemical structures. References to "a functional group" should be interpreted to include multiple instances of one type of functional group bonded to the tetrahedral silicate layer and alternately multiple instances of multiple types of functional groups bonded to the tetrahedral silicate layer. Without being bound by theory, it is believed that having mixed functional groups may improve the hydrogen bonding in the aqueous medium. In some conventional methods, an alkaline solution (NaOH) may be added to improve hydrogen bonding. It is believed that the presence of mixed functionalities may reduce the amount of alkaline solution required to activate hydrogen bonding, which may, thus, improve gel strength.

The functional groups may be covalently bonded to the tetrahedral silicate layer. The functionalized silicate layers may be obtained by reacting the octahedral brucite with a silane. Any silane containing a functional group and capable of forming a tetrahedral layer may be used. The silanes may be available as an aqueous solution, a non-aqueous solution, or a liquid. Examples of silanes for use in the layered magnesium silicate include phenyltrimethoxysilane, trimethoxy(propyl)silane, trimethoxymethylsilane, hexadecyltrimethoxysilane, octyltriethoxysilane, tetraethyl orthosilicate, N-[3-(trimethoxysilyl)propyl]ethylenediamine, (3-aminopropyl)triethoxysilane, silanes having the formula $RSi(OR")_3$, and combinations of the same. Where silanes have the formula $RSi(OR")_3$, R" may include a methyl group (—$CH_3$), an ethyl group (—$C_2H_5$), and combinations of the same; and R may include alkyl groups, aryl groups, and combinations of the same. Alkyl groups may include alkyl groups having saturated groups, alkyl groups having unsaturated groups, alkyl groups having functional substituents, and combinations of the same. Aryl groups may include aryl groups having saturated groups, aryl groups having unsaturated groups, aryl groups having functional substituents, and combinations of the same. The functional substituents may include amines, carboxylates, amides, acrylates, thiols, hydroxyls, isocyanates, methacrylates and combinations of the same. The functional substituents may be attached at the end of the chain, may be attached in-between, and combinations of the same. The functional substituents form functional groups of the silane. In at least one embodiment, the silanes for use in the layered magnesium silicate include phenyltrimethoxysilane, trimethoxy (propyl) silane, trimethoxymethylsilane, hexadecyltrimethoxysilane, octyltriethoxysilane, tetraethyl orthosilicate, N-[3-(trimethoxysilyl)propyl]ethylenediamine, (3-aminopropyl)triethoxysilane, and combinations of the same. In at least one embodiment, the silane has the formula $RSi(OR")_3$.

The silanes may be selected based on the desired functional group. The functional groups may include hydroxyl groups (—OH); saturated alkyl groups having the formula (—$CH_2(CH_2)_xCH_3$), where x is an integer between 0 and 18, phenyl groups, amine groups, diamine groups, carboxylate groups, amide groups, acrylate groups, thiol groups, methacrylate groups, isocyanate groups; and combinations of the same. Table 1 lists the functional group resulting from some silanes.

TABLE 1

| Silane | Functional Groups |
|---|---|
| phenyltrimethoxysilane | Phenyl group, —$C_6H_5$ |
| trimethoxy(propyl)silane | Saturated alkyl group, —$CH_2(CH_2)CH_3$ |
| trimethoxymethylsilane | Methyl group, —$CH_3$ |
| hexadecyltrimethoxysilane | Saturated alkyl group, —$CH_2(CH_2)_{14}CH_3$ |
| octyltriethoxysilane | Saturated alkyl group, —$CH_2(CH_2)_6CH_3$ |
| tetraethyl orthosilicate | —$OC_2H_5$ |
| N-[3-(trimethoxysilyl)-propyl]ethylenediamine | Diamine group, —$(CH_2)_3NH(CH_2)_2NH_2$ |
| (3-aminopropyl)triethoxysilane | Amine group, —$(CH_2)_3NH_2$ |
| $RSi(OR")_3$ | R" is a methyl group (—$CH_3$), an ethyl group (—$C_2H_5$), and combinations of the same; and R is an alkyl group, an aryl group, and combinations of the same. |

Producing the functionalized silicate layer from the at least two silanes that contains the desired functional groups results in a synthetic functionalized additive where the functional group is covalently bonded to the tetrahedral silicate layer of the layered magnesium silicate. As the functional groups extend from the tetrahedral silicate layer away from the octahedral brucite layer, the functional groups serve to separate the layered magnesium silicate platelets, as shown in FIG. 1.

In some embodiments, the layered magnesium silicate may have a silicon to magnesium ratio of from about 0.7:1 to 1.5:1 or from 1:1 to about 1.4:1 by mole. In further embodiments, the silicon to magnesium ratio may be about 1.33 by mole. Without being bound by theory, it is believed that the silicon to magnesium ratio may affect the crystallinity of the synthetic functionalized additive.

In some embodiments, the layered magnesium silicate may have a thickness of from 1 nm to 5 nm. In other embodiments, the layered magnesium silicate may have a thickness of from about 1 nm to about 4 nm, from about 1 nm to about 3 nm, from about 1 nm to about 2 nm, from about 2 nm to about 5 nm, from about 2 nm to about 4 nm, from about 2 nm to about 3 nm, from about 3 nm to about 5 nm, from about 3 nm to about 4 nm, or from about 5 nm to about 5 nm. In some embodiments, the layered magnesium silicate may have a lateral dimension of from about 10 nm to about 2000 nm (2 microns), from about 50 nm to about 1000 nm, or from about 100 nm to about 500 nm. In embodiments, the overall thickness of the layered magnesium silicate may depend on the length of the functional groups.

Methods of producing a synthetic functionalized additive will now be described. As stated previously, in some embodiments, the synthetic functionalized additive may include a layered magnesium silicate. For example, the methodology of synthesizing the layered magnesium silicate may be summarized by the following reaction (1), where LMS represents the layered magnesium silicate, in shorthand:

$$MgXW + GYSi(Z)_3 \rightarrow LMS \qquad (EQ. 1)$$

where X may include $Cl_2$, $Br_2$, $I_2$, $(OH)_2$, O, formates, citrates, or combinations; W may include water molecules and hydrates, G may include primary amines, secondary amines, tertiary amines, hydroxyl, epoxies, thiols, phenols, aminobenzenes, carboxylates, and combinations of these groups, Y may include ethyl, propyl, ethylene, diamine, diethylene thiamine, triethylene tetramine, phenyl, or combinations; and Z may include methoxy, ethanol, isopropyl alcohol, glycol, ethylene glycol, or combinations. In embodiments, the reaction may take place in alkalis including, for example, sodium hydroxide, potassium hydroxide, or combinations; alcohols including, for example, methanol, ethanol, isopropyl alcohol, glycol, ethylene glycol, or combinations.

In embodiments of the presently-described methods, the synthetic functionalized additives may be reproduced resulting in consistent composition from batch to batch. Consistent and reproducible results may be an advantage over other naturally-derived additives, such as organoclays or organically modified layered materials, which are subject to the impurities in the natural source. Additionally, the presently-described methods may be manipulated to produce certain results in the product, such as changing the crystallinity. Advantageously, the synthetic functionalized additives provide consistency for the duration of an application and reduce or eliminate the need for additional additives in drilling fluid formulations during use and application.

In embodiments, an amount of the magnesium salt may be mixed with a fluid medium to produce a magnesium containing fluid. Any fluid medium suitable for suspending a metal oxide or metal hydroxide reaction. The fluid medium may include water, an alcohol, and combinations of the same. Examples of the alcohol may include methanol, ethanol, propanol, butanol, and combinations. The amount of magnesium salt may be in the range from about 3 wt. % to about 15 wt. % based on the total weight of the magnesium containing fluid. In other embodiments, the amount of magnesium salt may be in the range from about 3 wt. % to about 10 wt. %, from about 3 wt. % to about 5 wt. %, from about 5 wt. % to about 15 wt. %, from about 5 wt. % to about 10 wt. %, or from about 10 wt. % to about 15 based on the total weight of the magnesium containing fluid.

An amount of at least two silanes may be added to the magnesium-containing fluid to produce a reactant mix. In embodiments, the amount of the at least two silanes added may have a combined weight from about 3 wt. % to about 15 wt. % based on the total weight of the reactant mix. In other embodiments, the amount of the at least two silanes may be a combined weight from about 3 wt. % to about 10 wt. %, from about 3 wt. % to about 5 wt. %, from about 5 wt. % to about 15 wt. %, from about 5 wt. % to about 10 wt. %, or from about 10 wt. % to about 15 based on the total weight of the reactant mix. The combined amount of the at least two silanes added may be determined to maintain a silicone to magnesium molar ratio in the layered magnesium silicate of between about 0.7:1 to 1.5:1, or from 1:1 to about 1.4:1. In at least one embodiment, the combined amount of the at least two silanes added results in a silicone to magnesium molar ratio in the layered magnesium silicate of 1.33:1.

It is believed that adding the amount of the at least two silanes to the magnesium-containing fluid may be important in producing a synthetic functionalized additive having the layered structure. A change in the order of mixing, by adding the magnesium salt to the at least two silanes may produce amorphous materials that do not possess the layered structure of the presently-disclosed synthetic functionalized additive.

An amount of aqueous hydroxide may be added to the reactant mix to produce the reaction mixture. In embodiments, the formation of the layer of octahedral brucite may begin upon addition of the aqueous hydroxide. Hydrolysis of the at least two silanes may begin upon addition of the aqueous hydroxide. In some embodiments, the aqueous hydroxide is sodium hydroxide. The aqueous hydroxide may adjust the pH of the reactant mix. The aqueous hydroxide may be added to the reactant mix to reach a target pH. In embodiments, the target pH may be from about 7 to about 12. In some embodiments, the target pH may be from about 9 to about 10. In further embodiments, the aqueous hydroxide is added while stirring. In further embodiments, the aqueous hydroxide is added while stirring for about 30 minutes.

In embodiments, each of the addition steps may be performed at a temperature in the range of from about 10 degrees Celsius (° C.) to about 35° C. In some embodiments, the addition steps may be performed at a temperature of from about 20° C. to about 30° C. In some embodiments, each of the addition steps may be performed at ambient pressure. Each addition step may be followed by a period of mixing.

The reaction mixture may be prepared in one reaction vessel. In some embodiments, the reaction vessel may be fitted with a stirring mechanism such that the mixture is constantly stirred during the addition steps. In some embodiments, the reaction vessel may be fitted with a condenser. In some embodiments, the reaction vessel may be configured for hydrothermal reaction, where the reaction mixture may be maintained at a pressure at the reflux conditions.

The reaction mixture may be mixed for a mixing period. In embodiments, the mixing period may be for at least 30 minutes or at least one hour. In some embodiments, the mixing period may be from about 30 minutes to about 72 hours, from about 4 to about 72 hours, from about 12 hours to a about 72 hours, or from about 24 hours to about 48 hours. Mixing the reaction mixture under an alkaline condition may enable the formation of brucite and the subsequent hydrolysis of the silanes.

Following the mixing period, the reaction mixture may be refluxed in the reaction vessel for a reflux period to produce the product mix. The reflux period may be at least 2 hours. In some embodiments, the reflux period may be from about 2 hours to about 1 week (168 hours), from about 2 hours to about 144 hours, from about 2 hours to about 120 hours, from about 2 hours to about 96 hours, from about 2 hours to about 72 hours, from about 2 hours to about 48 hours, or from about 2 hours to about 24 hours.

During the reflux period, the temperature in the reaction vessel may be increased to the refluxing condition. The refluxing condition may be the boiling point of the reaction mixture and may be from about 25° C. to about 110° C. In some embodiments, the refluxing condition may be from about 25° C. to about 100° C., from about 25° C. to about 75° C., from about 25° C. to about 50° C., from about 50° C. to about 110° C., from about 50° C. to about 100° C., from about 50° C. to about 75° C., from about 75° C. to about 110° C., from about 75° C. to about 100° C., or from about 100° C. to about 110° C. The condensation reactions of the at least two silanes may begin when the temperature in the reaction mixture is increased to the refluxing condition. The refluxing condition may allow for the two or more silanes to react to form the tetrahedral silicate layer having mixed functionalities on either side of the layer of octahedral brucite, resulting in the functionalized synthetic additive. The condensation reactions of the silanes continues for the reflux period. The functionalized silicate layers form on the layer of octahedral brucite during the reflux period. Without being bound by theory, it is believed that the reflux conditions may improve the crystallinity of the functionalized silicate layers. In embodiments, the length of the reflux period may influence the crystallinity of the layered magnesium silicates. In some embodiments, a longer reflux period may result in an increased lateral dimension. A hydrothermal reaction during the reflux period may allow crystallization and growth in the lateral dimension. In some embodiments, as the components boil, they may enter the condenser fitted onto the reaction vessel.

Following the refluxing step, the product mix may be subjected to one or more treatment operations to separate the solid layered magnesium silicates from the liquids in the product mix to produce the synthetic functionalized additive. The treatment operations may include reducing the temperature of the product mix, separating the solids, washing the solids, and drying the solids under vacuum. Separating the solids may be performed through filtration or through centrifuging. The separated solids may be washed with de-ionized water. In some embodiments, the product mix may be washed with deionized water more than once, for example, three times. In some embodiments, drying the solids under vacuum may be done at elevated temperatures or at room temperature. In embodiments, the product mix is dried at a temperature of at least 50° C., at least 60 C, at least 70 C, or at least 80 C.

Embodiments of the synthetic functionalized additive may be utilized in a variety of applications. The synthetic functionalized additive may be used as a viscosifier, a thixotropic control additive, a suspension additive, a nucleating agent additive, and a release rate control additive. The synthetic functionalized additive may be used as additives in well fluids, paints, inks, cosmetic formulations, personal care formulations, synthesis of nanocomposites from thermoplastic or thermosetting polymers, and therapeutic formulations (sustained release). Well fluids may include drilling fluids, packer fluids, lost circulation fluids, production fluids, and combinations of the same. The well fluid may be an aqueous-based fluid, an oil-based fluid, or combinations of the same. In embodiments, the synthetic functionalized additives may be used in place of organophilic nanosilicas.

In at least one embodiment, the synthetic functionalized additive may be mixed with a well fluid as a viscosifier to produce a rheologically-modified well fluid. The amount of synthetic functionalized additive added to the well fluid may be from about 1 gram to about 10 grams. In other embodiments, the amount of synthetic functionalized additive added to the well fluid may be from about 1 gram to about 5 grams or from about 5 grams to about 10 grams. The amount of synthetic functionalized additive in the rheologically-modified well fluid may be in an amount between 0.1% w/v and 20% w/v, alternately 0.5% w/v and 5% w/v, alternately between 1% w/v and 4% w/v, alternately between 1.5% w/v and 3.5% w/v. In at least one embodiment, the amount of the synthetic functionalized additive is 2% w/v. The rheologically-modified well fluid may be injected into a well.

Embodiments of a drilling fluid including the synthetic functionalized additive will now be described. Embodiments of drilling fluids including the synthetic functional additives may exhibit rheologically-independent behavior under high pressure and high temperature conditions meaning the drilling fluids may maintain their properties, such as viscosity and thixotropy, in the face of stresses and temperature. As such, in some embodiments, drilling fluids including the synthetic functionalized additive may be utilized to at least partially reduce thinning of the drilling fluids while drilling under HTHP downhole conditions. When compared to conventional drilling fluids, the drilling fluids including the synthetic functional additives may be less susceptible to stresses than conventional drilling fluids that do not exhibit rheologically-independent behavior. Drilling fluids containing the synthetic functional additives may, in embodiments, exhibit less change in viscosity due to variation in temperature as compared to the drilling fluids containing conventional rheology modifiers, such as organoclays, instead of the synthetic functional additives.

Figure 2:
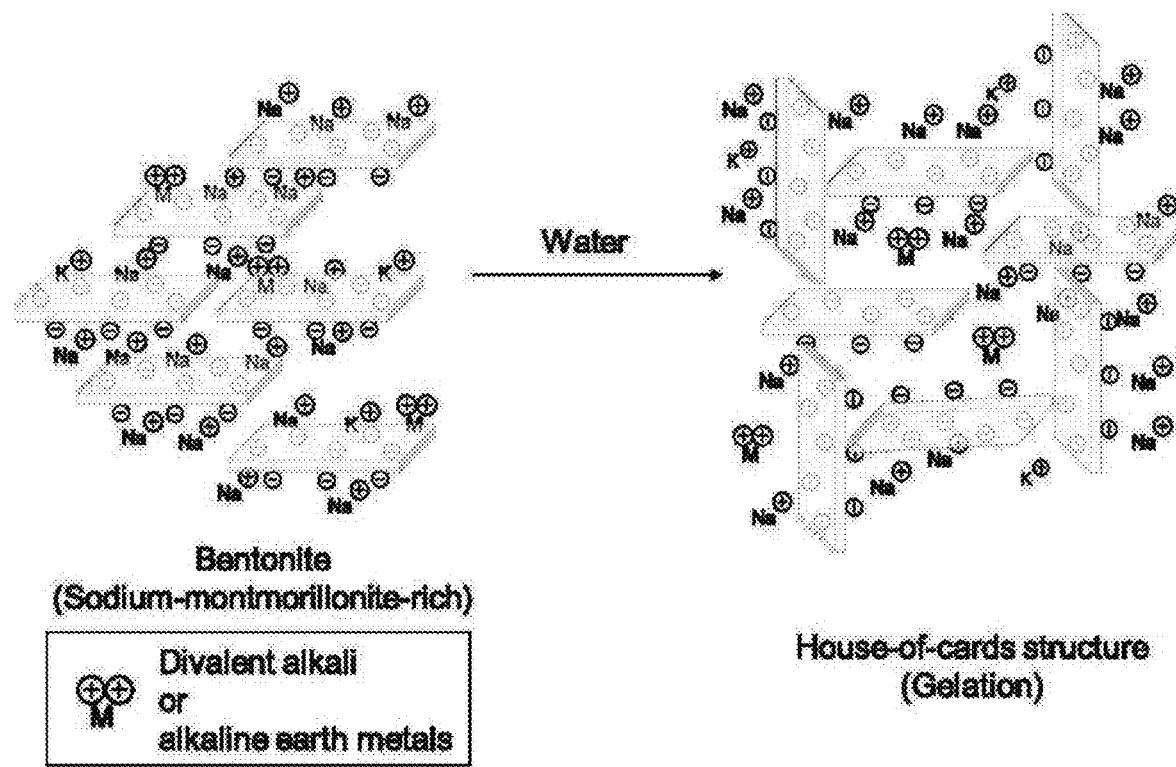
FIG. 2 is a schematic depiction of the gelation mechanism of a conventional water-based drilling fluid including sodium-monmorillonite-rich bentonite.
Figure 3:
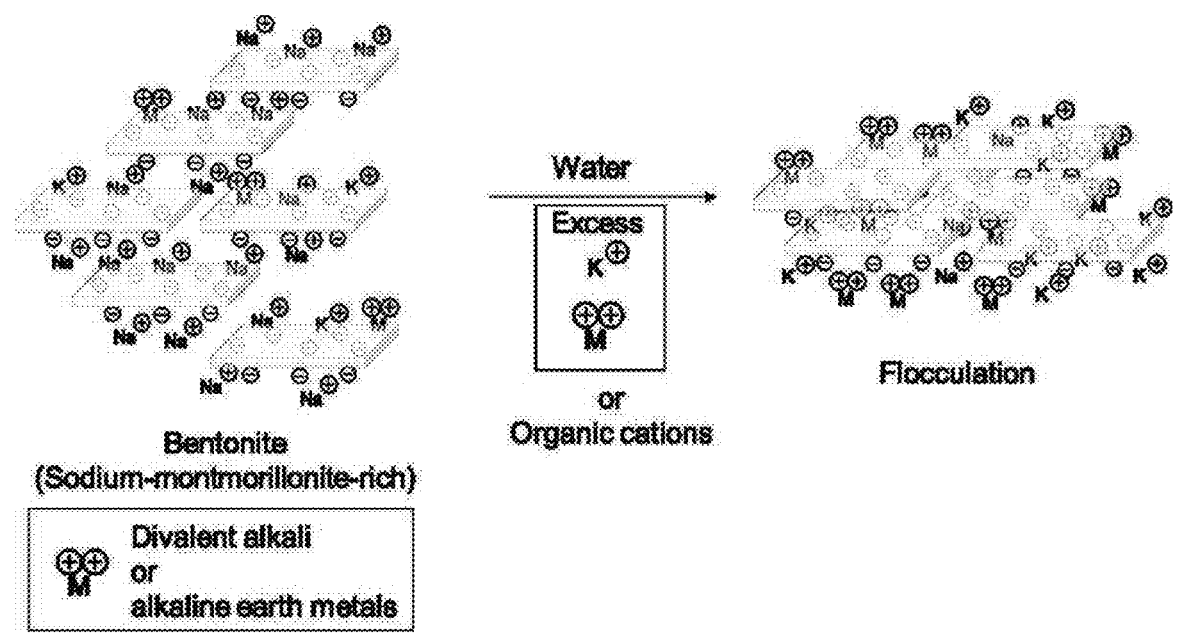
FIG. 3 is schematic depiction of the effect of excess alkali or alkaline earth cations or organic cations on the conventional water-based drilling fluid.

For a conventional drilling fluid formulation, several additives (that is, more than 10 types) may be required in order for the formulation to achieve desired rheological properties in well-treatment applications. In conventional drilling fluids, hydrophilic clays (including bentonites/montmorrilonites/hectorites) have been employed as viscosifiers in water-based drilling fluids in an attempt to maintain the rheological properties. These types of clays may be referred to as cationic layered materials. As shown in FIGS. 2-3, when these clays are added in to water, the lamellar structures of the bentonite may be disrupted and individual alumino-silcate platelets are dispersed in water. However, the network structure (FIG. 2) may not be stable in the presence of other cations, e.g. inorganic cations (including $K^+$, $Ca^{2+}$, $Mg^{2+}$) or organic cations (quaternary ammonium salts). As shown in FIG. 3, the presence of these cationic species, the layered materials under goes flocculation and thus loses the rheological properties. Therefore, the use of Smectite clays may be limited in drilling fluid applications.

Figure 4:
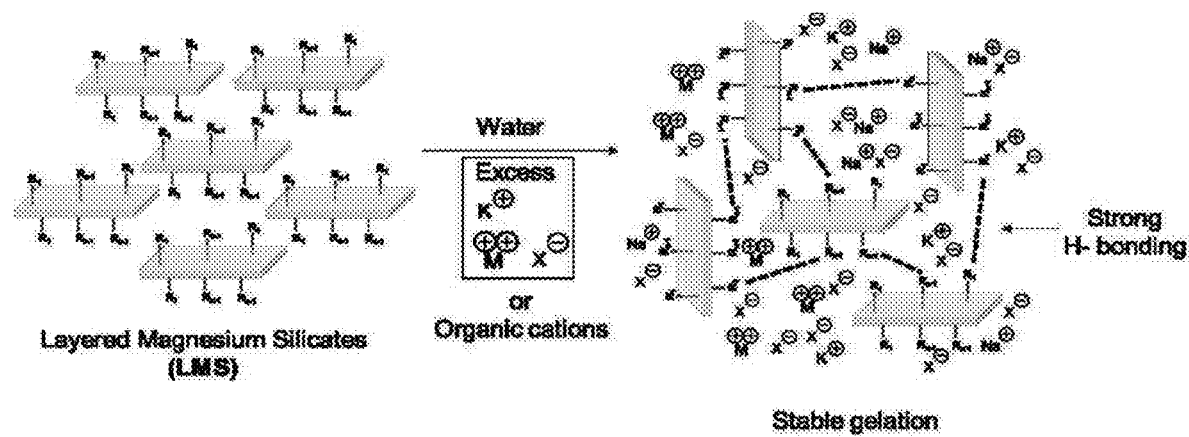
FIG. 4 is schematic depiction of the effect of excess alkali or alkaline earth cations or organic cations on a drilling fluid including the synthetic functionalized additives, according to one or more embodiments of the present disclosure.

Embodiments of the presently-described synthetic functional additives may include a layered magnesium silicate having strong covalent bonds between the mixed functional groups and the tetrahedral silicate layer. Without being bound by theory, it is believed that these covalent bonds between the mixed functional groups and the tetrahedral silicate layers may be more resistant to stress and remain intact during well-treatment processes, when compared to conventional drilling fluids. As shown in FIG. 4, drilling fluids including the presently-described synthetic functional additives may exhibit stable gelation in aqueous medium irrespective of the presence of alkali or alkaline earth cations or organic cations. Therefore, in some embodiments, a drilling fluid formulation that includes the presently-disclosed synthetic functionalized additives may reduce or eliminate the need for additional additives to achieve desired rheological properties, when compared to a conventional drilling fluid formulation. In some embodiments, the drilling fluid formulation that includes the presently-disclosed synthetic functionalized additives may include less than 10 or less than 5 additional additives. In further embodiments, the drilling fluid formulation that includes the presently-disclosed synthetic functionalized additives may require three or four additional additives. Examples of additional additives may include viscosifiers (including natural polymers, synthetic polymers, hydrophilic clays), shale inhibitors, lost circulation additives, fluid loss additives, emulsifiers, antifoaming agents, surfactants, pH controlling compounds, lubricants, weighing materials, and fluid medium (including water, brine, sea water).

The drilling fluid may include an aqueous base fluid and embodiments of the synthetic functionalized additive. The aqueous base fluid may include barite, bentonite, silica flour, polymers, viscosifiers, primary or secondary emulsifiers, fluid loss control additives, fluid stabilizers, loss circulation additives, metal salts, or combinations thereof. In embodiments, the aqueous base fluid of the subterranean wellbore fluid may include water.

In embodiments, the drilling fluid including the synthetic functional additives may have a gel strength (at temperatures of from 77° F. to 500° F., for 10 seconds) of from about 1 lb/100 ft$^2$ to about 5 lb/100 ft$^2$, from about 1 lb/100 ft$^2$ to about 4 lb/100 ft$^2$, from about 1 lb/100 ft$^2$ to about 3 lb/100 ft$^2$, from about 1 lb/100 ft$^2$ to about 2 lb/100 ft$^2$, from about 2 lb/100 ft$^2$ to about 5 lb/100 ft$^2$, from about 2 lb/100 ft$^2$ to about 4 lb/100 ft$^2$, from about 2 lb/100 ft$^2$ to about 3 lb/100 ft$^2$, from about 3 lb/100 ft$^2$ to about 5 lb/100 ft$^2$, from about 3 lb/100 ft$^2$ to about 4 lb/100 ft$^2$, or from about 4 lb/100 ft$^2$ to about 5 lb/100 ft$^2$. In embodiments, the drilling fluid including the synthetic functional additives may have a gel strength (at temperatures of from 77° F. to 500° F., for 10 minutes) of from about 5 lb/100 ft$^2$ to about 80 lb/100 ft$^2$, from about 5 lb/100 ft$^2$ to about 50 lb/100 ft$^2$, from about 5 lb/100 ft$^2$ to about 30 lb/100 ft$^2$, from about 5 lb/100 ft$^2$ to about 10 lb/100 ft$^2$, from about 10 lb/100 ft$^2$ to about 80 lb/100 ft$^2$, from about 10 lb/100 ft$^2$ to about 50 lb/100 ft$^2$, from about 10 lb/100 ft$^2$ to about 30 lb/100 ft$^2$, from about 30 lb/100 ft$^2$ to about 80 lb/100 ft$^2$, from about 30 lb/100 ft$^2$ to about 50 lb/100 ft$^2$, or from about 50 lb/100 ft$^2$ to about 80 lb/100 ft$^2$.

In embodiments, the drilling fluid including the synthetic functional additives may have a plastic viscosity (at temperatures of from 77° F. to 500° F.) of from about 10 centipoise (cP) to about 50 cP. In some embodiments, the drilling fluid including the synthetic functional additives may have a plastic viscosity (at temperatures of from 77° F. to 500° F.) of from about 10 cP to about 40 cP, from about 10 cP to about 30 cP, from about 10 cP to about 20 cP, from about 20 cP to about 50 cP, from about 20 cP to about 40 cP, from about 20 cP to about 30 cP, from about 30 cP to about 50 cP, from about 30 cP to about 40 cP, or from about 40 cP to about 50 cP.

In embodiments, the drilling fluid including the synthetic functional additives may have a yield point (at temperatures of from 77° F. to 500° F.) of from about 5 lb/100 ft² to about 35 lb/100 ft², from about 5 lb/100 ft² to about 25 lb/100 ft², from about 5 lb/100 ft² to about 15 lb/100 ft², from about 15 lb/100 ft² to about 35 lb/100 ft², from about 15 lb/100 ft² to about 25 lb/100 ft², or from about 25 lb/100 ft² to about 35 lb/100 ft².

In embodiments, the drilling fluid including the synthetic functional additives may have a low shear yield point (at temperatures of from 77° F. to 500° F.) of from about 0 lb/100 ft² to about 105 lb/100 ft², from about 10 lb/100 ft² to about 105 lb/100 ft², from about 10 lb/100 ft² to about 100 lb/100 ft², from about 10 lb/100 ft² to about 75 lb/100 ft², from about 10 lb/100 ft² to about 50 lb/100 ft², from about 10 lb/100 ft² to about 25 lb/100 ft², from about 25 lb/100 ft² to about 100 lb/100 ft², from about 25 lb/100 ft² to about 75 lb/100 ft², from about 25 lb/100 ft² to about 50 lb/100 ft², from about 50 lb/100 ft² to about 105 lb/100 ft², from about 50 lb/100 ft² to about 100 lb/100 ft², from about 50 lb/100 ft² to about 75 lb/100 ft², from about 75 lb/100 ft² to about 105 lb/100 ft², from about 75 lb/100 ft² to about 100 lb/100 ft², or from about 100 lb/100 ft² to about 105 lb/100 ft².

In embodiments, the mixing of formation clays or clay minerals (including Ca-montmorillonite) with the drilling fluid including the synthetic functional additives may not affect the plastic viscosity and yield point of the drilling fluids. When mixed with formation clays or clay minerals (including Ca-montmorillonite), the drilling fluid including the synthetic functional additives may have a plastic viscosity (at temperatures of from 77° F. to 500° F.) of from about 10 cP to about 50 cP, from about 10 cP to about 40 cP, from about 10 cP to about 30 cP, from about 10 cP to about 20 cP, from about 20 cP to about 50 cP, from about 20 cP to about 40 cP, from about 20 cP to about 30 cP, from about 30 cP to about 50 cP, from about 30 cP to about 40 cP, or from about 40 cP to about 50 cP. When mixed with formation clays or clay minerals (including Ca-montmorillonite), the drilling fluid including the synthetic functional additives may have a yield point (at temperatures of from 77° F. to 500° F.) of from about 10 lb/100 ft² to about 110 lb/100 ft², from about 10 lb/100 ft² to about 100 lb/100 ft², from about 10 lb/100 ft² to about 75 lb/100 ft², from about 10 lb/100 ft² to about 50 lb/100 ft², from about 10 lb/100 ft² to about 25 lb/100 ft², from about 25 lb/100 ft² to about 100 lb/110 ft², from about 25 lb/100 ft² to about 100 lb/100 ft², from about 25 lb/100 ft² to about 75 lb/100 ft², from about 25 lb/100 ft² to about 50 lb/100 ft², from about 50 lb/100 ft² to about 110 lb/100 ft², from about 50 lb/100 ft² to about 100 lb/100 ft², from about 50 lb/100 ft² to about 75 lb/100 ft², from about 75 lb/100 ft² to about 110 lb/100 ft², from about 75 lb/100 ft² to about 100 lb/100 ft², or from about 100 lb/100 ft² to about 110 lb/100 ft².

Test Methods

Gel Strength

Gel strength refers to the shear stress measured at a reduced shear rate following a defined period of time during which the material tested is maintained in a static state. The shear stress at reduced shear rate may be measured using a standard rheometer at ambient pressure, such as a FANN® Model 35 viscometer operated at reduced rotations per minute ("rpms"), such as at 3 rpm, according to the test methods described in API Recommended Practice On Determining the Static Gel Strength (RP 10B-6/ISO 10426-6: 2008). To measure the gel strength, the drilling fluid is first stirred by contacting the drilling fluid with the spindle of the viscometer and operating the viscometer at 600 rotations per minute (rpm). The viscometer is then turned off for a period of time (time period). For a 10-second gel strength the time period is 10 seconds, and for a 10-minute gel strength the time period is 10 minutes. It should be understood that other time periods for measuring gel strength may be used as reference times for measurements of gel strength. During the time period, the drilling fluid comes to rest in a static state. Upon expiration of the time period, the viscometer is turned back on at a reduced speed, such as 3 rpm for example, to generate a reduced shear rate. The viscometer reading is then taken. The gel strength of the drilling fluid is reported in units of pounds of force per 100 square feet (lbf/100 ft²).

Rheological Properties (Plastic Viscosity, Yield Point, Low Shear Yield Point, and Apparent Viscosity)

The rheological properties of the drilling fluids may be modeled based on Bingham plastic flow behavior. The rheological behavior of the drilling fluids may be determined by measuring the shear stress on the composition at different shear rates, which may be accomplished by measuring the shear stress, the shear rate, or both on the composition using a FANN® Model 35 viscometer operated at 3 rpm, 6 rpm, 100 rpm, 200 rpm, 300 rpm, or 600 rpm, for example. The rheology of the drilling fluids may be evaluated from the plastic viscosity (PV) and the yield point (YP), which are parameters from the Bingham plastic rheology model. The PV is related to the resistance of the composition to flow due to mechanical interaction between the solids of the composition and represents the viscosity of the composition extrapolated to infinite shear rate. The PV of the drilling fluids may be estimated by measuring the shear stress of the drilling fluids using a FANN® Model 35 viscometer at spindle speeds of 300 rotations per minute (rpm) and 600 rpm and subtracting the 300 rpm viscosity measurement from the 600 rpm viscosity measurement according to Equation 2 (EQ. 2), which is subsequently provided. The PV values determined for the drilling fluids are provided in this disclosure in units of centipoise (cP).

$$PV = \text{(viscosity at 600 rpm)} - \text{(viscosity at 300 rpm)} \quad \text{(EQ. 2)}$$

The yield point (YP) of the drilling fluids represents the amount of stress required to move a fluid from a static condition. The YP is determined by extrapolating the Bingham plastic rheology model to a shear rate of zero. The YP of the drilling fluid may be estimated from the PV from EQ. 2 by subtracting the PV from the shear stress measured at 300 rpm according to Equation 3 (EQ. 3), which is provided subsequently.

$$YP = \text{(300 rpm reading)} - PV \quad \text{(EQ. 3)}$$

The YP is expressed as a force per area, such as pounds of force per one hundred square feet (lbf/100 ft²).

The low shear yield point (LSYP) of the drilling fluids may be measured using a standard rheometer at ambient pressure. The LSYP of the drilling fluids may be estimated by measuring the shear stress of the drilling fluids using a FANN® Model 35 viscometer at spindle speeds of 3 rpm and 6 rpm and according to Equation 4 (EQ. 4), which is subsequently provided. The LSYP values determined for the drilling fluids are provided in this disclosure in units of pounds of force per one hundred square feet (lbf/100 ft²).

$$\text{Low Shear Yield Point (LSYP)} = 2 \text{ (3 rpm reading)} - \text{(6 rpm reading)} \quad \text{(EQ. 4)}$$

The apparent viscosity of the drilling fluids may be measured using a standard rheometer at ambient pressure. The apparent viscosity of the drilling fluids may be estimated by measuring the shear stress of the drilling fluids using a FANN® Model 35 viscometer at spindle speeds of 600 rpm Equation 5 (EQ. 5), which is subsequently provided. The apparent viscosity values determined for the drilling fluids are provided in this disclosure in units of pounds of force per one hundred square feet (lbf/100 ft$^2$).

$$\text{Apparent Viscosity} = (600 \text{ rpm reading})/2 \quad (\text{EQ. 5})$$

EXAMPLES

The following examples illustrate features of the present disclosure but are not intended to limit the scope of the disclosure. The following experiments compared the performance of wellbore fluids with varying inhibitor additives, some of which included examples of presently-described synthetic functionalized additives.

Example 1—Synthesis of Synthetic Functionalized Additives

In Example 1, one or more siloxanes were used. In Samples 1-1, 1-2, 1-3, and 1-4, the ratio of the two siloxanes were varied. In Example 1, the siloxanes used included aminopropyltriethoxysilane and tetraethyl orthosilicate to obtain synthetic functionalized additives with mixed functionalities.

Based on Samples 1-1, 1-2, 1-3, and 1-4 and Comparative Samples 1-A and 1-B, It was observed that the presence of hydroxyl groups in combination with amine functionalities may improve the hydrogen bonding in an aqueous medium. As stated previously in this disclosure, generally, an alkaline solution (NaOH) may be added to improve hydrogen bonding. In the presence of mixed functionalities, the amount of alkaline solution required to activate hydrogen bonding may be minimized. Comparative Example 1-A (—NH$_2$) and Comparative Example 1-A (—OH), subsequently described in more detail, each have only one distinct functionality. It is believed that the amine-terminated layered magnesium silicate of Comparative Example 1-A may potentially form a gel structure in alkaline condition. However, it is believed that the hydroxyl terminated layered magnesium silicate of Comparative Example 1-B is unable to form gel structure irrespective of any activators.

Sample 1-1

To produce Sample 1-1, magnesium chloride hexahydrate (9.96 g) was dissolved in 200 mL of ethanol. Subsequently, aminopropyltriethoxysilane (11.7 g) and tetraethyl orthosilicate (2.5 g) were added with stirring at room temperature (20-30° C.). 1 N NaOH solution was added until the pH reached 10-12 at room temperature with continuous stirring over a period of 1 hour. The reaction mixture was stirred at this condition for 3-4 hours, followed by refluxing for 43 hours. The reaction mixture was then cooled, filtered/centrifuged, washed with de-ionized water (100 mL, three times), and dried at 80° C. in vacuum to obtain Sample 1-1.

Sample 1-2

To produce Sample 1-2, magnesium chloride hexahydrate (9.96 g) was dissolved in 200 mL of ethanol. Subsequently, aminopropyltriethoxysilane (7.2 g) and tetraethyl orthosilicate (6.8 g) were added with stirring at room temperature (20-30° C.). 1 N NaOH solution was added until the pH reached at 10-12 at room temperature with continuous stirring over a period of 1 hour. The reaction mixture was stirred at this condition for 3-4 hours, followed by refluxing for 43 hours. The reaction mixture was then cooled, filtered/centrifuged, washed with de-ionized water (100 mL, three times), and dried at 80° C. in vacuum to obtain Sample 1-2.

Sample 1-3

To produce Sample 1-3, magnesium chloride hexahydrate (9.96 g) was dissolved in 200 mL of ethanol. Subsequently, aminopropyltriethoxysilane (9.5 g) and tetraethyl orthosilicate (4.6 g) were added with stirring at room temperature (20-30° C.). 1 N NaOH solution was added until the pH reached at 10-12 at room temperature with continuous stirring over a period of 1 hour. The reaction mixture was stirred at this condition for 3-4 hours, followed by refluxing for 43 hours. The reaction mixture was then cooled, filtered/centrifuged, washed with de-ionized water (100 mL, three times), and dried at 80° C. in vacuum to obtain Sample 1-3.

Sample 1-4

To produce Sample 1-4, magnesium chloride hexahydrate (9.96 g) was dissolved in 200 mL of ethanol. Subsequently, aminopropyltriethoxysilane (4.9 g) and tetraethyl orthosilicate (9.0 g) were added with stirring at room temperature (20-30° C.). 1 N NaOH solution was added until the pH reached at 10-12 at room temperature with continuous stirring over a period of 1 hour. The reaction mixture was stirred at this condition for 3-4 hours, followed by refluxing for 43 hours. The reaction mixture was cooled, filtered/centrifuged, washed with de-ionized water (100 mL, three times), and dried at 80° C. in vacuum to obtain Sample 1-4.

Comparative Sample 1-A

To produce Comparative Sample 1-A, magnesium chloride hexahydrate (9.96 g) was dissolved in 200 mL of ethanol. Subsequently, aminopropyltriethoxysilane (14.4 g) was added with stirring at room temperature (20-30° C.). 1 N NaOH solution was added until the pH reached at 10-12 at room temperature with continuous stirring over a period of 1 hour. The reaction mixture was stirred at this condition for 3-4 hours, followed by refluxing for 43 hours. The reaction mixture was cooled, filtered/centrifuged, washed with de-ionized water (100 mL, three times), and dried at 80° C. in vacuum to obtain Sample 1-5.

Comparative Sample 1-B

To produce Comparative Sample 1-B, magnesium chloride hexahydrate (9.96 g) was dissolved in 200 mL of ethanol. Subsequently, tetraethyl orthosilicate (13.5 g) was added with stirring at room temperature (20-30° C.). 1 N NaOH solution added until the pH reached at 10-12 at room temperature with continuous stirring over a period of 1 hour. The reaction mixture was stirred at this condition for 3-4 hours, followed by refluxing for 43 hours. The reaction mixture was cooled, filtered/centrifuged, washed with de-ionized water (100 mL, three times), and dried at 80° C. in vacuum to obtain Sample 1-6.

Example 2—Preparation of Drilling Fluids

In Example 2, drilling fluids of Comparative Sample 2-A and Samples 2-1, 2-2, 2-3, and 2-were prepared as subsequently described.

Comparative Sample 2-A (Without Synthetic Functionalized Additive)

To produce Comparative Sample 2-A (having no synthetic functionalized additive), xanthan gum (0.36 g) was solubilized in water (234 g), and the mixture was kept at 80° C. in static condition for 5 hours. Then, the solution was cooled. Barite (65.52 g) was then added to the cooled solution and shear mixed for 5 min at room temperature. Then, the mixture was hot rolled for 16 hours. The formulation of Comparative Sample 2-A, aged at 90° C. is provided in Table 2.

TABLE 2

Formulation of Comparative Sample 2-A.

| Component | Amount (g) |
| --- | --- |
| Water | 234 |
| Xanthan Gum | 0.36 |
| Barite | 65.52 |
| Total | 299.9 |
| Density | 10.0 lb/gal |

Sample 2-1 (Including Synthetic Functionalized Additive)

To produce Sample 2-1, Sample 1-1 of Example 1 previously described (4.3 g) was added to water (231 g) and shear mixed for 10 minutes. Then, sodium hydroxide (1.5 g) was added, and the mixture was shear mixed for 10 minutes. Then, xanthan gum (0.36 g) was added and shear mixed for 10 minutes. The solution was then kept at 80° C. in static condition for 5 hours and then cooled. Barite (63.6 g) was added to the cooled solution, which was then shear mixed for 5 min at room temperature and hot rolled for 16 hours. The formulation of Sample 2-1, aged at 90° C. is provided in Table 3.

TABLE 3

Formulation of Sample 2-1.

| Component | Amount (g) |
| --- | --- |
| Water | 231 |
| Sample 1-1 | 4.3 |
| Sodium hydroxide | 1.5 |
| Xanthan Gum | 0.36 |
| Barite | 63.6 |
| Total | 301 |
| Density | 10.02 lb/gal |

Sample 2-2 (Including Synthetic Functionalized Additive)

To produce Sample 2-2, Sample 1-1 of Example 1 previously described (4.3 g) was added to water (213 g) and shear mixed for 10 minutes. Then, sodium hydroxide (1.5 g) was added, and the mixture was shear mixed for 10 minutes. Then, xanthan gum (0.36 g) was added and shear mixed for 10 minutes. The solution was then kept at 80° C. in static condition for 5 hours and then cooled. Barite (142 g) was added to the cooled solution, which was then shear mixed for 5 min at room temperature and hot rolled for 16 hours. The formulation of Sample 2-2, aged at 90° C. is provided in Table 4.

TABLE 4

Formulation of Sample 2-2.

| Component | Amount (g) |
| --- | --- |
| Water | 213 |
| Sample 1-1 | 4.3 |
| Sodium hydroxide | 1.5 |
| Xanthan Gum | 0.36 |
| Barite | 142 |
| Total | 361 |
| Density | 12.0 lb/gal |

Sample 2-3 (Including Synthetic Functionalized Additive)

To produce Sample 2-3, Sample 1-1 of Example 1 previously described (4.3 g) was added to water (231 g) and shear mixed for 10 minutes. Then, sodium hydroxide (1.5 g) was added, and the mixture was shear mixed for 10 minutes. Then, xanthan gum (0.36 g) was added and shear mixed for 10 minutes. The solution was then kept at 80° C. in static condition for 5 hours and then cooled. Barite (63.6 g) was added to the cooled solution, which was then shear mixed for 5 min at room temperature. Ca-montmorillonite (Ca-MMT) (15 g) was then added and shear mixed for 5 min and hot rolled for 16 hours. The formulation of Sample 2-3, aged at 90° C. is provided in Table 5.

TABLE 5

Formulation of Sample 2-3.

| Component | Amount (g) |
| --- | --- |
| Water | 231 |
| Sample 1-1 | 4.3 |
| Sodium hydroxide | 1.5 |
| Xanthan Gum | 0.36 |
| Barite | 63.6 |
| Ca-Montmorillonite | 15 |
| Total | 316 |
| Density | 10.25 lb/gal |

Sample 2-4 (Including Synthetic Functionalized Additive)

To produce Sample 2-5, Sample 1-1 of Example 1 previously described (4.3 g) was added to water (213 g) and shear mixed for 10 minutes. Then, sodium hydroxide (1.5 g) was added and shear mixed for 10 minutes. Then, xanthan gum (0.36 g) was added and shear mixed for 10 minutes. The solution was kept at 80° C. in static condition for 5 hours and cooled. Barite (142 g) was added to the cooled solution, which was then shear mixed for 5 min at room temperature. Ca-montmorillonite (Ca-MMT) (15 g) was added and shear mix for 5 min and hot rolled for 16 hours. The formulation of Sample 2-4, aged at 90° C. is provided in Table 6.

TABLE 6

Formulation of Sample 2-4.

| Component | Amount (g) |
| --- | --- |
| Water | 213 |
| Sample 1-1 | 4.3 |
| Sodium hydroxide | 1.5 |
| Xanthan Gum | 0.36 |
| Barite | 142 |
| Ca-montmorillonite | 15 |
| Total | 376 |
| Density | 12.2 lb/gal |

Example 3—Analysis of Drilling Fluids

The drilling fluids of Comparative Sample 2-A and Samples 2-1, 2-2, 2-3, and 2-were tested utilizing a Rheometer at ambient pressure. The rheological property measurements were performed at different temperatures ranging from 77° F. to 180° F. The rheological parameters (plastic viscosity, apparent viscosity, yield point, low shear yield point) were derived from the data collected from the rheometer according to the test methods previously provided in this disclosure.

To observe the effects of synthetic functionalized additives on the drilling fluids of Comparative Sample 2-A, Sample 2-1, and Sample 2-2, the gelation characteristics were analyzed. The results are provided subsequently in Table 7.

TABLE 7

Gelation characteristics of Comparative Sample 2-A, Sample 2-1, and Sample 2-2.

| Sample | Gel | 80° F. | 100° F. | 140° F. | 180° F. |
|---|---|---|---|---|---|
| Comparative Sample 2-A | 10 sec. | 3 | 3 | 2 | 1 |
|  | 10 min. | 4 | 3 | 2 | 2 |
| Sample 2-1 | 10 sec. | 7 | 6 | 5 | 5 |
|  | 10 min. | 10 | 15 | 29 | 26 |
| Sample 2-2 | 10 sec. | 8 | 8 | 6 | 5 |
|  | 10 min. | 19 | 20 | 23 | 21 |

As shown in Table 7, the gelation (10 sec and 10 min) of Samples 2-1 and 2-2, both having synthetic functionalized additive, was higher when compared with Comparative Sample 2-A having no synthetic functionalized additive. It was also observed that this increase in gelation with respect to rise in temperature reached an apparent plateau after 140° F.

To observe the effects of synthetic functionalized additives on the drilling fluids of Comparative Sample 2-A, Sample 2-1, and Sample 2-2, the rheological properties were analyzed. The results are provided subsequently in Table 8.

TABLE 8

Comparison of the rheological properties of Formulations A, B, and C at various temperatures.

| Property | Sample | 80° F. | 100° F. | 140° F. | 180° F. |
|---|---|---|---|---|---|
| Plastic viscosity (cP) | Comparative Sample 2-A | 6 | 4 | 3 | 2 |
|  | Sample 2-1 | 19 | 17 | 14 | 11 |
|  | Sample 2-2 | 35 | 32 | 22 | 18 |
| Yield point (lb/100 ft$^2$) | Comparative Sample 2-A | 7 | 5 | 4 | 4 |
|  | Sample 2-1 | 21 | 16 | 12 | 15 |
|  | Sample 2-2 | 24 | 17 | 12 | 12 |
| Low Shear Yield Point (lb/100 ft$^2$) | Comparative Sample 2-A | 1 | 0 | 0 | 1 |
|  | Sample 2-1 | 5 | 2 | 3 | 3 |
|  | Sample 2-2 | 5 | 3 | 2 | 2 |

As shown in Table 8, the rheological properties (plastic viscosity (PV), yield point (YP), and low shear yield point (LSYP)) Samples 2-1 and 2-2, both having synthetic functionalized additive, were improved when compared with Comparative Sample 2-A having no synthetic functionalized additive. It was also observed that the PV, YP, and LSYP increased and stabilized after 140° F.

To observe the effects of synthetic functionalized additives on the drilling fluids that have been contaminated by formation clays or clay minerals, the rheological properties Sample 2-3 and Sample 2-4 were analyzed. Therefore, the drilling fluids of Sample 2-3 and Sample 2-4 included Ca-montmorillonite to replicate the mixing of formation in the drilling fluids. The results are provided subsequently in Table 9.

TABLE 9

Rheological properties of Formulations D and E (the effect of mixing of formation is demonstrated by adding Ca-montmorillonite).

| Property | Sample | 80° F. | 100° F. | 140° F. | 180° F. |
|---|---|---|---|---|---|
| Plastic viscosity (cP) | Sample 2-3 | 43 | 33 | 15 | 9 |
|  | Sample 2-4 | 32 | 35 | 23 | 13 |
| Yield point (lb/100 ft$^2$) | Sample 2-3 | 35 | 50 | 68 | 65 |
|  | Sample 2-4 | 66 | 92 | 104 | 84 |

As shown in Table 9, the rheological properties (plastic viscosity (PV) and yield point (YP)) of Samples 2-3 and 2-4, both having synthetic functionalized additive, were not adversely affected by the presence of Ca-montmorillonite.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The present disclosure includes one or more non-limiting aspects. A first aspect may include a method of producing a synthetic functionalized additive, the method comprising: mixing a magnesium salt with a fluid medium to produce a magnesium-containing fluid; adding a first silane and a second silane to the magnesium-containing fluid to produce a reactant mix, here the first silane and the second silane have different compositions; adding an aqueous hydroxide to the reactant mix to produce a reaction mixture; mixing the reaction mixture for a mix period; refluxing the reaction mixture for a reflux period to produce a product mix; treating the product mix to separate the synthetic functionalized additive, where the synthetic functionalized additive comprises a layered magnesium having mixed functionalities.

A second aspect may include the first aspect, where the first silane and the second silane are selected from the group consisting of phenyltrimethoxysilane, trimethoxy(propyl)silane, trimethoxymethylsilane, hexadecyltrimethoxysilane, octyltriethoxysilane, tetraethyl orthosilicate, N-[3-(trimethoxysilyl)propyl]ethylenediamine, (3-aminopropyl)triethoxysilane, and combinations of the same.

A third aspect may include any of the preceding aspects, further comprising adding one or more additional silanes to the first silane, the second silane, and the magnesium-containing fluid to produce the reactant mix.

A fourth aspect may include any of the preceding aspects, where the magnesium salt is selected from the group consisting of magnesium chloride, magnesium nitrate, magnesium bromide, and combinations of the same.

A fifth aspect may include any of the preceding aspects, where the magnesium-containing fluid comprises from 3 wt. % and 15 wt. % magnesium salt, based on the total weight of the magnesium-containing fluid.

A sixth aspect may include any of the preceding aspects, where the fluid medium is selected from the group consisting of water, an alcohol, and combinations of the same.

A seventh aspect may include any of the preceding aspects, where the reactant mix comprises from 3 wt. % to 12 wt. % of the first silane and the second silane, based on the total weight of the reactant mix.

An eighth aspect may include any of the preceding aspects, where a molar ratio of silicone to magnesium in the synthetic functionalized additive is in a range of from 0.7:1 to 1.5:1 by mole.

A ninth aspect may include any of the preceding aspects, where the aqueous hydroxide is selected from the group consisting of sodium hydroxide, potassium hydroxide, ammonium hydroxide, and combinations.

A tenth aspect may include any of the preceding aspects, where the aqueous hydroxide is added to the reactant mix to produce a reaction mixture having a pH of from 7 to 12.

An eleventh aspect may include any of the preceding aspects, where the reflux period is from 2 hours to 1 week.

A twelfth aspect may include any of the preceding aspects, where the mixed functionalities are selected from the group consisting of hydroxyl groups (—OH); saturated alkyl groups having the formula (—$CH_2(CH_2)_xCH_3$), where x is an integer between 0 and 18; phenyl groups; amine groups; diamine groups; carboxylate groups; amide groups; acrylate groups; thiol groups; methacrylate groups; isocyanate groups; and combinations.

A thirteenth aspect may include any of the preceding aspects, where treating product mix to separate the synthetic functionalized additive further comprises: reducing the temperature of the product mix; separating solids in the product mix from a liquid in the product mix in a solids separator, where the solids separator is selected from the group consisting of a filter unit and a centrifuge; and drying the solids separated in the solids separator to produce the synthetic functionalized additive.

A fourteenth aspect may include a synthetic functionalized additive comprising: a layered magnesium silicate, the layered magnesium silicate comprising: a first functionalized silicate layer comprising a first tetrahedral silicate layer covalently bonded to at least two different functional groups, an octahedral brucite layer, the octahedral brucite layer comprising magnesium, and a second functionalized silicate layer comprising a second tetrahedral silicate layer covalently bonded to at least two different functional groups, where the octahedral brucite layer is positioned between the first functionalized silicate layer and the second functionalized silicate layer; and where the at least two different functional groups covalently bonded to the first tetrahedral silicate layer are the same or different than the at least two different functional groups covalently bonded to the second tetrahedral silicate layer.

A fifteenth aspect may include the fourteenth aspect, where a thickness of the layered magnesium silicate is at least 1 nanometer, and where a lateral dimension of the layered magnesium silicate is from 2 nm to 5 microns.

A sixteenth aspect may include the fourteenth or fifteenth aspects, where the at least two different functional groups covalently bonded to the first tetrahedral silicate layer, the second tetrahedral silicate layer, or both are selected from the group consisting of hydroxyl groups (—OH), saturated alkyl groups having the formula (—$CH_2(CH_2)_xCH_3$), where x is an integer between 0 and 18, phenyl groups, amine groups, diamine groups, carboxylate groups, amide groups, acrylate groups, thiol groups, methacrylate groups, isocyanate groups, and combinations of the same.

A seventeenth aspect may include a drilling fluid comprising: an aqueous base fluid, and a synthetic functionalized additive comprising: a layered magnesium silicate, the layered magnesium silicate comprising: a first functionalized silicate layer comprising a first tetrahedral silicate layer covalently bonded to at least two different functional groups, an octahedral brucite layer, the octahedral brucite layer comprising magnesium, and a second functionalized silicate layer comprising a second tetrahedral silicate layer covalently bonded to at least two different functional groups, where the octahedral brucite layer is positioned between the first functionalized silicate layer and the second functionalized silicate layer; and where the at least two different functional groups covalently bonded to the first tetrahedral silicate layer are the same or different than the at least two different functional groups covalently bonded to the second tetrahedral silicate layer.

An eighteenth aspect may include the seventeenth aspect, where the at least two different functional groups covalently bonded to the first tetrahedral silicate layer, the second tetrahedral silicate layer, or both are selected from the group consisting of hydroxyl groups (—OH), saturated alkyl groups having the formula (—$CH_2(CH_2)_xCH_3$), where x is an integer between 0 and 18, phenyl groups, amine groups, diamine groups, carboxylate groups, amide groups, acrylate groups, thiol groups, methacrylate groups, isocyanate groups, and combinations of the same.

A nineteenth aspect may include any of the seventeenth through eighteenth aspects, where the amount of the synthetic functionalized additive is between 0.1% w/v to 20% w/v.

A twentieth aspect may include any of the seventeenth through nineteenth aspects, where the drilling fluid has a plastic viscosity of greater than 10 cP.

What is claimed is:

1. A method of producing a rheologically-modified well fluid, the method comprising:
    producing a synthetic functionalized additive comprising the steps of:
        mixing a magnesium salt with a fluid medium to produce a magnesium-containing fluid;
        adding a first silane and a second silane to the magnesium-containing fluid to produce a reactant mix, where the first silane and the second silane have different compositions;
        adding an aqueous hydroxide to the reactant mix to produce a reaction mixture;
        mixing the reaction mixture for a mix period;
        refluxing the reaction mixture for a reflux period to produce a product mix; and
        treating the product mix to separate the synthetic functionalized additive, where the synthetic functionalized additive comprises a layered magnesium having mixed functionalities; and
    mixing the synthetic functionalized additive with a well fluid to produce the rheologically-modified well fluid.

2. The method of claim 1, where the first silane and the second silane are selected from the group consisting of phenyltrimethoxysilane, trimethoxy(propyl)silane, trimethoxymethylsilane, hexadecyltrimethoxysilane, octyltriethoxysilane, tetraethyl orthosilicate, N-[3- (trimethoxysilyl)propyl]ethylenediamine, (3-aminopropyl)triethoxysilane, and combinations of the same.

3. The method of claim 1, further comprising adding one or more additional silanes to the first silane, the second silane, and the magnesium-containing fluid to produce the reactant mix.

4. The method of claim 1, where the magnesium salt is selected from the group consisting of magnesium chloride, magnesium nitrate, magnesium bromide, and combinations of the same.

5. The method of claim 1, where the magnesium-containing fluid comprises from 3 wt. % and 15 wt. % magnesium salt, based on the total weight of the magnesium-containing fluid.

6. The method of claim 1, where the fluid medium is selected from the group consisting of water, an alcohol, and combinations of the same.

7. The method of claim 1, where the reactant mix comprises from 3 wt. % to 12 wt. % of the first silane and the second silane, based on the total weight of the reactant mix.

8. The method of claim 1, where a molar ratio of silicon to magnesium in the synthetic functionalized additive is in a range of from 0.7:1 to 1.5:1 by mole.

9. The method of claim 1, where the aqueous hydroxide is selected from the group consisting of sodium hydroxide, potassium hydroxide, ammonium hydroxide, and combinations.

10. The method of claim 1, where the aqueous hydroxide is added to the reactant mix to produce a reaction mixture having a pH of from 7 to 12.

11. The method of claim 1, where the reflux period is from 2 hours to 1 week.

12. The method of claim 1, where the mixed functionalities are selected from the group consisting of hydroxyl groups (—OH); saturated alkyl groups having the formula (—$CH_2(CH_2)_xCH_3$), where x is an integer between 0 and 18; phenyl groups; amine groups; diamine groups; carboxylate groups; amide groups; acrylate groups; thiol groups; methacrylate groups; isocyanate groups; and combinations.

13. The method of claim 1, where treating product mix to separate the synthetic functionalized additive further comprises:
reducing the temperature of the product mix;
separating solids in the product mix from a liquid in the product mix in a solids separator, where the solids separator is selected from the group consisting of a filter unit and a centrifuge; and
drying the solids separated in the solids separator to produce the synthetic functionalized additive.

\* \* \* \* \*